(12) United States Patent
Maeda

(10) Patent No.: US 6,233,123 B1
(45) Date of Patent: May 15, 2001

(54) MAGNETIC RECORDING/REPRODUCING APPARATUS

(75) Inventor: Osamu Maeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/521,575

(22) Filed: Mar. 9, 2000

Related U.S. Application Data

(63) Continuation of application No. 09/111,460, filed on Jul. 7, 1998.

(30) Foreign Application Priority Data

Jul. 9, 1997 (JP) .............................................. U09-005968

(51) Int. Cl.[7] .................................................. G11B 5/52
(52) U.S. Cl. ...................................................... 360/281.3
(58) Field of Search ............................ 360/281.3, 281.4, 360/281.5, 281.8, 282

(56) References Cited

U.S. PATENT DOCUMENTS

| | | | |
|---|---|---|---|
| 5,053,881 | 10/1991 | Campisi | 358/254 |
| 5,094,513 | 3/1992 | Fukuda | 312/7.2 |
| 5,564,778 | 10/1996 | Higuchi et al. | 348/836 |

FOREIGN PATENT DOCUMENTS

| | | |
|---|---|---|
| 59-154486 | 9/1984 | (JP) . |
| 2-41574 | 3/1990 | (JP) . |
| 3016157 | 9/1995 | (JP) . |

OTHER PUBLICATIONS

Panasonic PV–1230 Service Manual. (Figs. on pp. 5–7 of vol. 5 & 2; The 2 Items About Transformer Products on p. 104; Items in 2 are in English on Lower Right Half of the Same Page).

*Primary Examiner*—Allen T. Cao

(57) ABSTRACT

A magnetic recording/reproducing apparatus, comprising a video circuit including a cylinder with a magnetic head and a power circuit provided with a transformer having a core with a gap formed in it. The transformer is positioned so that a direction for connecting a S pole with a N pole created by a leakage magnetic flux from the gap of the core and a direction for connecting a central portion of the cylinder, where the magnetic head is provided, with the central portion of the gap of the transformer together defining a substantially horizontal plane, and the cylinder and the transformer are positioned at a distance so that a reading signal read by the magnetic head is hardly influenced by the leakage magnetic flux.

12 Claims, 3 Drawing Sheets

F I G. 3
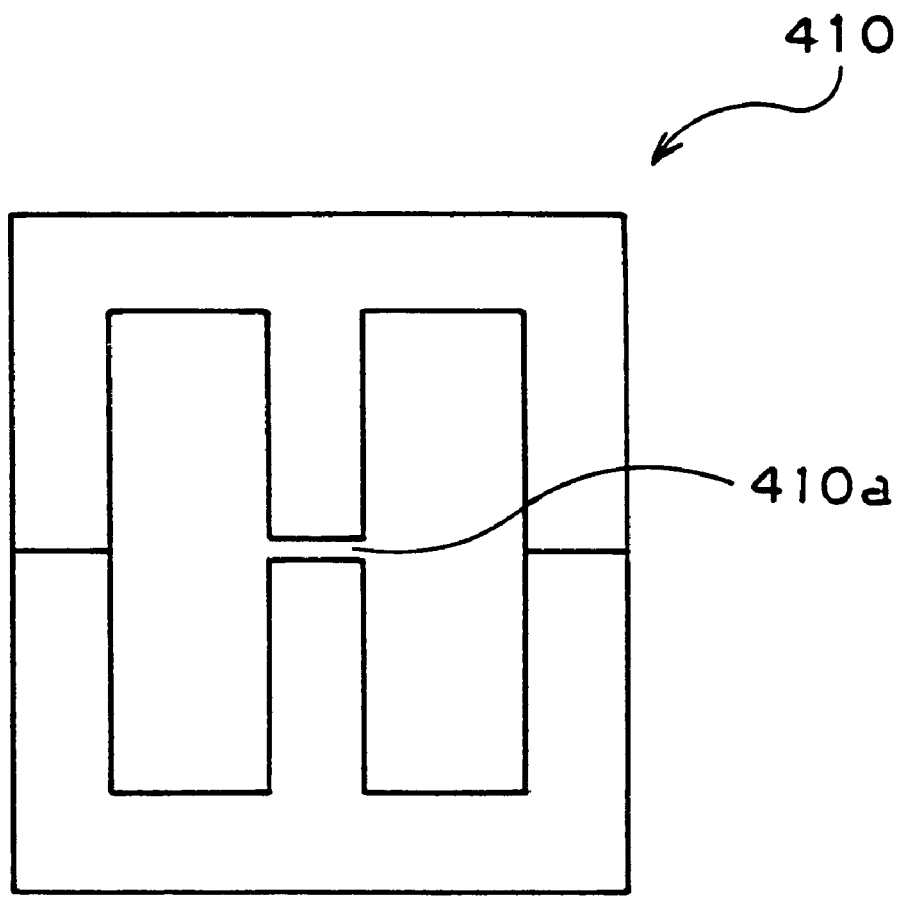

MAGNETIC RECORDING/REPRODUCING APPARATUS

This application is a continuation of Ser. No. 09/111,460 filed Jul. 7, 1998.

DETAILED DESCRIPTION OF THE INVENTION

1. Field of the Invention

This invention relates to a magnetic record reproducing apparatus, and more particularly, to a video tape recorder and a television with a video tape recorder to it.

2. Prior Art

In the conventional magnetic record reproducing apparatus, and more particularly, a video tape recorder, a power circuit, and a circuit except for it, namely, a video circuit were engaged in another print wiring substrate, and were positioned at a distance to avoid the influences of electric noises and magnetic fields and heat of the power pulse transfer.

PROBLEMS TO BE SOLVED BY THE INVENTION

A shield plate was required to be covered on the power circuit, because the power circuit and the video circuit were hard to avoid the influences of the magnetic field of the pulse transfer for power use in the space limited even if they were positioned at some distance.

Between the print wiring substrate engaged with the power circuit and the print wiring substrate with the video circuit being engaged with it were required many connecting wirings, whereby the operationally was worse and further electric noises were easy to be provided in these wirings.

An object of this invention is to provide a magnetic record reproducing apparatus having a configuration aimed at reducing the cost.

MEANS FOR SOLVING THE PROBLEMS

In the magnetic record reproducing apparatus of this invention, the power circuit is provided with a transfer having a core with a gap being formed init, and the transfer is positioned so that a direction for connecting the S pole with the N pole by the leakage magnetic flux from the gap of the core and a direction for connecting the central portion of the cylinder, where the magnetic head is provided with the central portion of the gap of the transfer may become approximately vertical, and the cylinder and the transfer is positioned with such a length being open as a reading signal by the magnetic head is hardly influenced by the leakage magnetic flux.

Thus, the magnetic flux leaking from the transfer hardly comes out in the direction of the magnetic head. Since the cylinder where the magnetic head is provided and the transfer are positioned with such a distance being open as a reading signal by the magnetic head is hardly influenced by the leakage magnetic flux, the magnetic head is hardly subject to ill influences by the leakage magnetic flux.

In the magnetic record reproducing apparatus of this invention, the electronic parts of the power circuit is engaged with a power region which is one region in one print wiring substrate, the electronic parts for the record reproducing use, having a magnetic head except for the electronic parts of the power circuit, is provided with the print wiring substrate mounted in the record reproducing circuit region which is a region except for the power region of the print wiring substrate Also, the power circuit of the power region is provided with a transfer having a core with a gap being formed in it, the transfer is positioned so that a direction for connecting the S pole with the N pole by the leakage magnetic flux the gap of the core and a direction for connecting the central portion of the cylinder, where the magnetic head is provided, with the central portion of the gap of the transfer may become approximately vertical, and the cylinder and the transfer are positioned with such a distance being open as a reading signal by the magnetic head is hardly influenced by the leakage magnetic flux.

In this case the magnetic flux leak from the transfer hardly comes out in the direction of the magnetic head. Since the cylinder where the magnetic head is provided and the transfer is positioned with such a distance being open as a reading signal by the magnetic head is hardly influenced by the leakage magnetic flux, the magnetic head is hardly subject to ill influences by the leakage magnetic flux. The electronic parts of the power circuit, and the record reproducing electronic parts such as a magnetic head except for the electronic parts of the power circuit are positioned an one print wiring substrate by the positioning in different region on the print wiring substrate.

In a magnetic record reproducing apparatus of this invention, the above description can be conducted even if the transfer is large in relatively leakage magnetic flux as in the pulse transfer.

The magnetic record reproducing apparatus is to include the magnetic reproducing specific apparatus.

PREFERRED EMBODIMENT OF THE INVENTION

The embodiment of the magnetic record reproducing apparatus of this invention will be described with reference to FIG. 1 through FIG. 3.

FIG. 1 is a schematic plan view showing the positional relation between the print wiring substrate in the magnetic record reproducing apparatus of this invention, the head on the cylinder and the pulse transfer, and the condition or the leakage magnetic flux of the pulse transfer. FIG. 2 is a schematic side view of a pulse transfer in the magnetic record reproducing apparatus of this invention. FIG. 3 is a plan view showing the core portion of the pulse transfer.

As shown in FIG. 1, the magnetic record reproducing apparatus of this invention is comprised of a print wiring substrate 100, a video mechanism parts mounting chassis 200 mounted in the upper portion of the print wiring substrate 100, a cylinder 300 positioned on the video mechanism parts mounting chassis 200, and a pulse transfer 400 of the power circuit positioned in the upper portion of the print wiring substrate 100, and in a region where the video mechanism parts mounting chassis 200 is not mounted.

The print wiring substrate 100 is comprised of a power region 110, a record regenerating circuit region 120 except for the power region 110.

On the record reproducing circuit region 120 is engaged a main parts of record reproducing electronic parts not shown with a chassis 200 to cover the upper portion side of the main parts.

In the cylinder 300 is provided with the magnetic head 310.

As shown in FIG. 2, the pulse transfer 400 is a split winding type, which is different by 90° from the normal split winding type in the coil winding direction, and is a type of being mounted with the normal split winding type laying horizontally.

The pulse transfer 400 is comprised of a core portion 410, a base winding 420, primary windings 421, 423, a secondary winding 422, and section walls 430, 431, 432, 433, 434 for separating these windings.

As shown in FIG. 3, the core portion 410 is an E—E type ferrite core where E and E are combined with.

The core portion 410 has a gap 410a at its center.

The respective lower end sides 430a, 431a, 432a, 433a, 434a of the section walls 430, 431, 432 433, 434 are inserted into the through hole portions not shown of the print wiring substrate 100, thereby forming substrate terminal portions to be soldered and fixed.

The substrate terminal portion 430a is connected with one end portion 420a of the base winding 420, and the other end portion of the base winding 420 positioned on the inner side in FIG. 2. The substrate terminal portion 431a is connected with one end portion 421a of the primary winding 421, and with the other end portion of the primary winding 421 positioned on the inner side in FIG. 2. The substrate terminal portion 432a is NC. The substrate terminal portion 433a is connected with an end portion 422a of the secondary winding 422, and with the other end portion of the secondary winding 422 positioned on the inner side in FIG. 2. The substrate terminal 434a is connected with one end portion 423a of the primary winding 423, and with the other end portion of the primary winding 423 positioned on the inner side in FIG. 2.

High frequency current flows to the pulse transfer 400. Since it is an alternating field in the direction of the magnetic pole, in FIG. 2, the N pole becomes the left side when the S pole is on the right, while the S pole becomes left when the N pole is on the right side. Prom the gap 410a of the core portion 410 is generated a leakage flux 450 (see FIG. 1) in accordance with the magnetic pole direction.

The leakage magnetic flux 450 is generated in the longitudinal length in the direction of the magnetic pole.

The pulse transfer 400 is positioned in the power region 110 of the printing wiring substrate 100 so that a direction for connecting the S pole and the N pole with the leakage magnetic flux 450 from the gap 410a of the core 410 may become almost vertical to the direction for connecting the central portion of the cylinder 300 where the magnetic head 310 is provided and with the central portion of the gap 410a of the core 410.

The power region 110 is provided in the farthest region from the cylinder 300.

The pulse transfer 400 should be preferable to be positioned near the center of the power region 110, as shown in, for example, FIG. 1, to radiate heat to be caused when the high frequency current flows.

In the magnetic record reproducing apparatus of this invention constructed as above, the pulse transfer 400 is positioned to the magnetic head 310 provided in the cylinder 300 so that the leakage magnetic flux 450 from the pulse transfer 400 may not affect. Since the magnetic record reproducing apparatus of this invention does not require a shield plate to be covered on the pulse transfer 400, the cost can be made lower.

The print wiring substrate 100 is one substrate comprised of a power region 110 and a record reproducing circuit 120 except for the power region 110. As when two print wiring substrates or more are provided as before, a plurality of connecting wirings are not required to be provided between the print wiring substrate with the power circuit being embodied and the print wiring substrate with the video circuit being embodied. Unnecessary operating time which is required to perform the connecting wiring between the print wiring substrates can be saved. Further, since no connecting wiring is provided between the print wiring substrates, the circuit configuration is hard to have electric noises generated.

The configuration of the pulse transfer 400 of such a configuration is not limited to the above description except for the positional relation (for example, shape of the core, number of the windings, positional relation among the windings) among the winding direction, and the terminal portion to be inserted into the print wiring substrate.

The pulse transfer 400 can be replaced by a different type of transfer which has the same configuration as that in the direction of the leakage magnetic flux and performs the electrically same function.

In the above description, the video recorder is described as a magnetic record reproducing apparatus of this invention. As described above even in the other magnetic record reproducing apparatus such as television with a video tape recorder to it, a tape recorder, the similar effects can be obtained when the magnetic head and the power transfer are provided. The description thereof is omitted.

EFFECT OF THE INVENTION

As described above, in the magnetic record reproducing apparatus of the claim 1 of this invention, the power circuit is provided with a transfer having a core with a gap being formed in it, and the transfer is positioned so that a direction for connecting the S pole with the N pole by the leakage magnetic flux from the gap at the core and a direction for connecting the central portion of the cylinder, where the magnetic head is provided, with the central portion of the gap of the transfer may become approximately vertical, and the cylinder and the transfer are positioned with such a distance being open as a reading signal by the magnetic head is hardly influenced by the leakage magnetic flux.

Thus, the magnetic flux leaked from the transfer hardly comes out in the direction of the magnetic head. Since the cylinder where the magnetic head is provided, and the transfer are positioned with such a distance being open as a reading signal by the magnetic head is hardly influenced by the leakage magnetic flux, the magnetic head is hardly subject to ill influences by the leakage magnetic flux.

Thus, a shield plate for covering the entire power circuit is not required as conventionally, thus reducing the cost.

In the magnetic record reproducing apparatus of the claim 2 of this invention, an electronic parts of the power circuit is engaged with a power region which is one region of one print wiring substrate, the electronic parts for the record reproducing use, having a magnetic head except for the electronic parts of the power circuit, is provided with the print wiring substrate mounted in the record reproducing circuit region which is a region except for the power region of the print wiring substrate. Also, the power circuit of the power region is provided with a transfer having a core with a gap being formed in it, the transfer is positioned so that a direction for connecting the S pole with the N pole by the leakage magnetic flux from the gap of the core and a direction for connecting the central portion of the cylinder, where the magnetic head is provided, with the central portion of the gap of the transfer may become approximately vertical, and the cylinder and the transfer are positioned with such a distance being open as a reading signal by the magnetic head is hardly influenced by the leakage magnetic flux.

In this case, the magnetic flux leaked from the transfer hardly comes out in the direction of the magnetic head. Since the cylinder where the magnetic head is provided, and the transfer are positioned with such a distance being open as a reading signal by the magnetic head is hardly influenced by the leakage magnetic flux, the magnetic head is hardly subject to ill influences by the leakage magnetic flux. Thus, the shield plate for covering the entire power circuit is not required as conventionally, thus reducing the cost.

The electronic parts of the power circuit, and the record reproducing electronic parts such as magnetic head except for the electronic parts of the power circuit are positioned on one print wiring substrate by the positioning in different region on the print wiring substrate. Thus, many connecting wirings are not required to be provided between the print wiring substrate where the power circuit is engaged and the print wiring substrate where the video circuit is engaged, as divided in the conventional two print wiring substrates or more. Unnecessary operation time which was required to conduct the connecting wiring between the print wiring substrates can be saved. Thus, lower cost can be provided. Since no connecting wiring between the print wiring substrates is provided the electric noises are hard to be provided.

In a magnetic record reproducing apparatus of the claim 3 of this invention, the above description can be conducted even if the transfer is large in relatively leakage magnetic flux as in the pulse transfer.

BRIEF DESCRIPTION OF THE DRAWINGS

FIG. 3 is a plan view showing the core portion of a pulse transfer.

Figure 1:
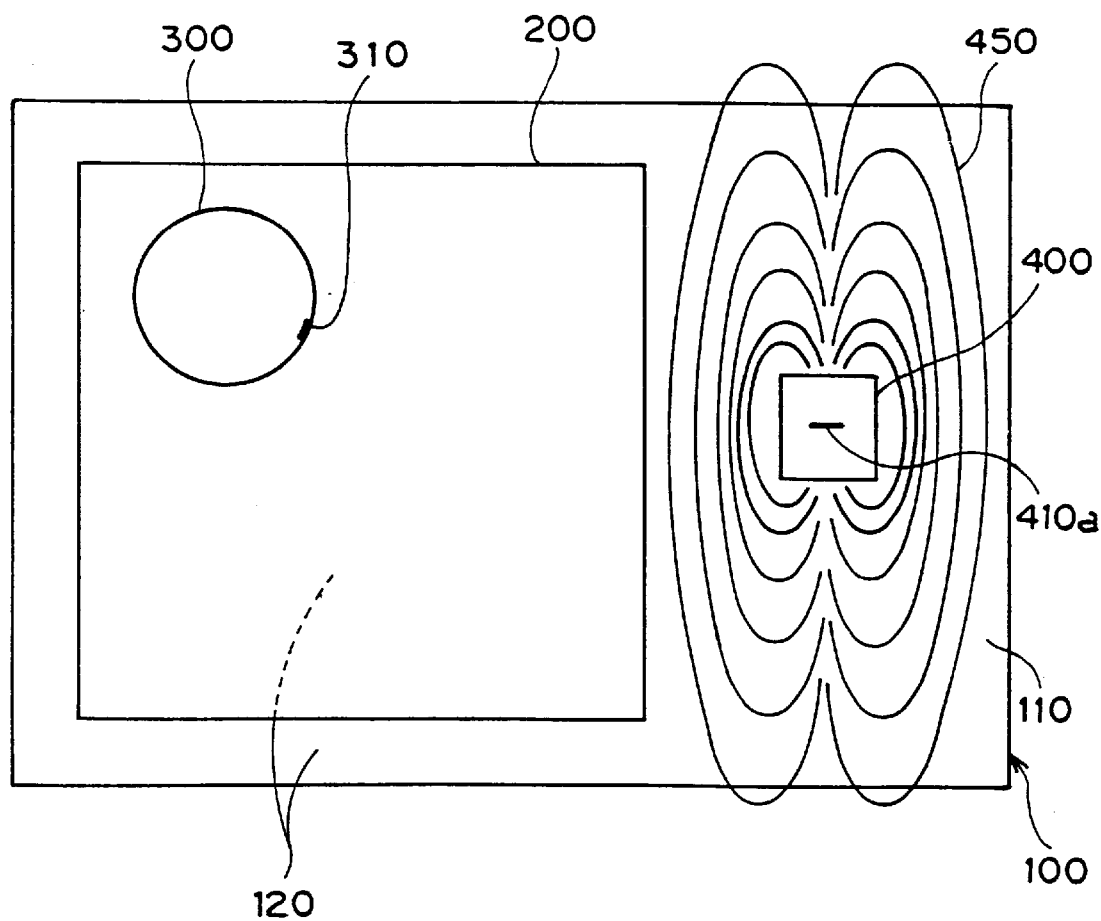
FIG. 1 is a schematic plan view showing the positional relation between a print wiring substrate in the magnetic record reproducing apparatus of this invention, a magnetic head on the cylinder, and a pulse transfer, and a condition of the leakage magnetic flux of the pulse transfer.
Figure 2:
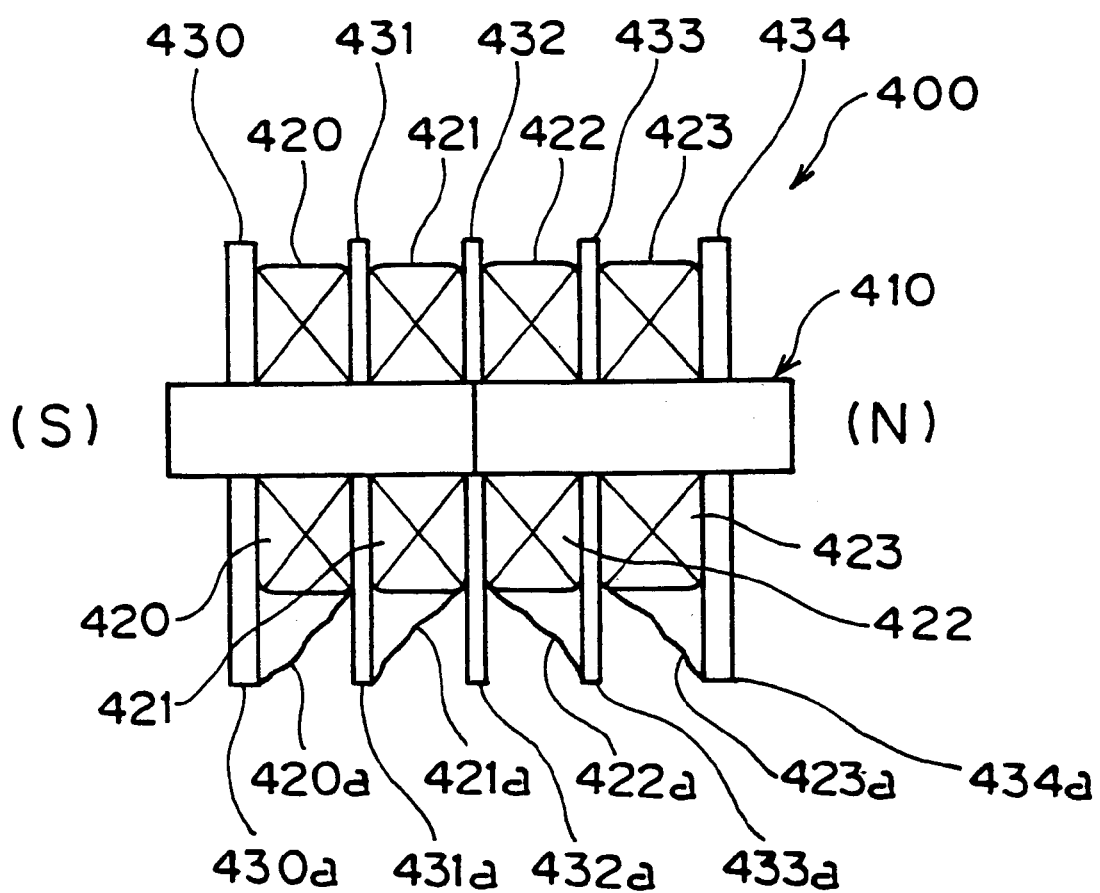
FIG. 2 is a schematic side view showing a pulse transfer in the magnetic record reproducing apparatus of this invention.

What is claimed is:

1. A magnetic recording/reproducing apparatus, comprising a video circuit including a cylinder with a magnetic head and a power circuit provided with a transformer having a core with a gap formed in it, the transformer being positioned so that a direction for connecting a S pole with a N pole created by a leakage magnetic flux from said gap of said core and a direction for connecting a central portion of said cylinder, where said magnetic head is provided, with the central portion of the gap of the transformer together defines a substantially horizontal plane and said cylinder and said transformer are positioned at a distance so that a reading signal read by said magnetic head is hardly influenced by the leakage magnetic flux.

2. A magnetic recording/reproducing apparatus, comprising electronic parts of a power circuit are arranged in a power region which is one region on one printed wiring substrate, the electronic parts for the recording/reproducing function having a cylinder with a magnetic head and, except for the electronic parts of said power circuit, are provided with a printed wiring substrate mounted in the recording/reproducing circuit region which is a region outside of the power region of the printed wiring substrate, said power circuit in said power region being provided with a transformer having a core with a gap being formed in it, said transformer being positioned so that a direction for connecting a S pole with a N pole created by a leakage magnetic flux from said gap of said core and a direction for connecting a central portion of said gap of said transformer together define a substantially horizontal plane, and said cylinder and said transformer being positioned a distance so that a reading signal read by said magnetic head is hardly influenced by the leakage magnetic flux.

3. A magnetic recording/reproducing apparatus, comprising a video circuit including a cylinder with a magnetic head and a power circuit supported on a substrate provided with a transformer having a core with a gap formed in it, the transformer being positioned so that a direction for connecting a S pole with a N pole created by a leakage magnetic flux from the said gap of said core and a direction for connecting a central portion of said cylinder, where said magnetic head is provided, with the central portion of the gap of the transformer together defining a plane substantially parallel to said substrate and said cylinder and said transformer are positioned at a distance and oriented so that a reading signal read by said magnetic head is hardly influenced by the leakage magnetic flux.

4. A magnetic recording/reproducing apparatus as defined in claim 3, wherein at least portions of said power circuit are mounted on said substrate.

5. A magnetic recording/reproducing apparatus as defined in claim 3, wherein said transformer is mounted on said substrate.

6. A magnetic recording/reproducing apparatus, comprising a video circuit including a cylinder with a magnetic head and a power circuit supported on a substrate provided with a transformer mounted on said substrate and having a core with a gap formed in it defining a plane substantially normal to said substrate, the transformer being positioned so that a direction for connecting a S pole with a N pole created by a leakage magnetic flux from said gap of said core is substantially parallel to said substrate, said cylinder and said transformer being positioned at a distance and oriented relative to each other so that a reading signal read by said magnetic head is hardly influenced by the leakage magnetic flux.

7. A magnetic recording/reproducing apparatus as defined in claim 1, wherein said gap is located substantially at the geometrical center of said transformer.

8. A magnetic recording/reproducing apparatus as defined in claim 4, wherein said gap is located substantially at the geometrical center of said transformer.

9. A magnetic recording/reproducing apparatus as defined in claim 6, wherein said gap is located substantially at the geometrical center of said transformer.

10. A magnetic recording/reproducing apparatus as defined in claim 1, wherein said transformer core defines a plane substantially arranged in said horizontal plane.

11. A magnetic recording/reproducing apparatus as defined in claim 3, wherein said transformer core defines a plane substantially parallel to said substrate.

12. A magnetic recording/reproducing apparatus as defined in claim 6, wherein said transformer core defines a plane substantially parallel to said substrate.

* * * * *